(12) United States Patent
Kachmar et al.

(10) Patent No.: US 8,805,151 B2
(45) Date of Patent: Aug. 12, 2014

(54) LASHING TOGETHER MULTIPLE FIBER OPTIC TELECOMMUNICATIONS CABLES

(75) Inventors: Wayne M. Kachmar, North Bennington, VT (US); Ronald J. Kleckowski, Manchester Center, VT (US); Trevor D. Smith, Eden Prairie, MN (US)

(73) Assignee: ADC Telecommunications, Inc., Berwyn, PA (US)

(*) Notice: Subject to any disclaimer, the term of this patent is extended or adjusted under 35 U.S.C. 154(b) by 385 days.

(21) Appl. No.: 13/111,606

(22) Filed: May 19, 2011

(65) Prior Publication Data

US 2012/0128309 A1 May 24, 2012

Related U.S. Application Data

(60) Provisional application No. 61/346,290, filed on May 19, 2010.

(51) Int. Cl.
*G02B 6/00* (2006.01)
*B65H 54/00* (2006.01)
*H02G 1/02* (2006.01)
*H02G 1/08* (2006.01)

(52) U.S. Cl.
USPC ........... 385/135; 385/134; 385/136; 242/470; 242/471; 242/472; 242/473; 242/474; 242/475; 242/476; 242/477; 242/478; 242/479; 242/480; 242/481; 242/482; 242/483; 242/484; 242/485; 242/486; 242/487; 242/488; 254/134.3 CL; 254/134.3 R

(58) Field of Classification Search
USPC ......................... 385/134–136; 242/470–488; 254/134.3 CL, 134.3 R
See application file for complete search history.

(56) References Cited

U.S. PATENT DOCUMENTS

| | | | |
|---|---|---|---|
| 2,767,742 A * | 10/1956 | Channell | 140/93 R |
| 3,991,014 A | 11/1976 | Kleinschuster | |
| 4,067,852 A | 1/1978 | Calundann | |
| 4,083,829 A | 4/1978 | Calundann et al. | |

(Continued)

FOREIGN PATENT DOCUMENTS

| | | | | |
|---|---|---|---|---|
| JP | 59-195617 | 11/1984 | | |
| JP | 60177312 A | * 9/1985 | | G02B 6/44 |

(Continued)

OTHER PUBLICATIONS

International Search Report and Written Opinion mailed Feb. 9, 2012.

(Continued)

*Primary Examiner* — Ryan Lepisto
*Assistant Examiner* — Guy Anderson
(74) *Attorney, Agent, or Firm* — Merchant & Gould P.C.

(57) ABSTRACT

A lashing assembly lashes together two or more fiber optic telecommunications cables. The lashing assembly comprises at least a first and a second bobbin. As the cables are passed through the first bobbin, twine pays off from the first bobbin and wraps around the cables in a clockwise helix. As the cables are passed through the second bobbin, twine pays off from the second bobbin and wraps around the cables in a counterclockwise helix. In this way, the twine from the first and second bobbins lash the cables together as the cables are passed through the first and second bobbins.

20 Claims, 6 Drawing Sheets

(56) References Cited

U.S. PATENT DOCUMENTS

| | | | |
|---|---|---|---|
| 4,130,545 A | | 12/1978 | Calundann |
| 4,161,470 A | | 7/1979 | Calundann |
| 4,318,842 A | | 3/1982 | East et al. |
| 4,395,869 A | * | 8/1983 | Priaroggia et al. ............... 57/13 |
| 4,468,364 A | | 8/1984 | Ide |
| 4,715,582 A | * | 12/1987 | Ikeda et al. .......... 254/134.3 CL |
| 4,744,935 A | * | 5/1988 | Priaroggia et al. ............ 264/103 |
| 4,763,983 A | * | 8/1988 | Keith ........................ 385/102 |
| 4,832,442 A | * | 5/1989 | Pappas ........................ 385/102 |
| 5,126,167 A | * | 6/1992 | Matsuno et al. ............ 427/163.2 |
| 5,136,673 A | * | 8/1992 | Yoshizawa et al. ........... 385/103 |
| 5,209,416 A | * | 5/1993 | LeCompte ................. 242/476.7 |
| 5,268,971 A | | 12/1993 | Nilsson et al. |
| 5,279,474 A | * | 1/1994 | LeCompte ................ 242/602.1 |
| 5,317,663 A | | 5/1994 | Beard et al. |
| 5,345,525 A | | 9/1994 | Holman et al. |
| 5,345,526 A | | 9/1994 | Blew |
| 5,390,273 A | | 2/1995 | Rahman et al. |
| 5,421,501 A | * | 6/1995 | Haines ........................ 226/190 |
| 5,448,670 A | * | 9/1995 | Blew et al. ................... 385/112 |
| 5,497,444 A | | 3/1996 | Wheeler |
| 5,595,355 A | * | 1/1997 | Haines ........................ 242/470 |
| 5,717,810 A | | 2/1998 | Wheeler |
| 5,863,083 A | | 1/1999 | Giebel et al. |
| 5,905,834 A | | 5/1999 | Anderson et al. |
| 6,491,051 B2 | | 12/2002 | Pierce et al. |
| 6,557,249 B1 | * | 5/2003 | Pruett et al. ................... 29/825 |
| 6,612,516 B1 | * | 9/2003 | Haines ..................... 242/397.1 |
| 6,775,445 B2 | * | 8/2004 | Kobayashi et al. ........... 385/113 |
| 6,805,333 B2 | * | 10/2004 | Delaney et al. ...... 254/134.3 CL |
| 7,016,592 B2 | | 3/2006 | Elkins, II et al. |
| 7,090,406 B2 | | 8/2006 | Melton et al. |
| 7,151,879 B2 | * | 12/2006 | Ishikawa et al. ............. 385/114 |
| 7,257,298 B2 | * | 8/2007 | Moon et al. ................... 385/112 |
| 7,379,642 B2 | | 5/2008 | Kachmar |
| 7,416,349 B2 | | 8/2008 | Kramer |
| 7,418,177 B2 | | 8/2008 | Lu et al. |
| 7,421,169 B2 | * | 9/2008 | Honjo et al. .................. 385/100 |
| 7,587,111 B2 | | 9/2009 | de Montmorillon et al. |
| 7,623,747 B2 | | 11/2009 | de Montmorillon et al. |
| 7,644,905 B2 | * | 1/2010 | Ogata et al. .......... 254/134.3 CL |
| 7,715,679 B2 | | 5/2010 | Kowalczyk et al. |
| 2005/0029004 A1 | | 2/2005 | Robinson et al. |
| 2005/0259930 A1 | | 11/2005 | Elkins, II et al. |
| 2005/0265672 A1 | | 12/2005 | Theuerkorn et al. |
| 2008/0063351 A1 | | 3/2008 | Elkins, II et al. |
| 2009/0294016 A1 | | 12/2009 | Sayres et al. |
| 2009/0317038 A1 | | 12/2009 | Kachmar |
| 2009/0317047 A1 | | 12/2009 | Smith et al. |
| 2010/0014819 A1 | | 1/2010 | Herbst |
| 2011/0188809 A1 | | 8/2011 | LeBlanc et al. |

FOREIGN PATENT DOCUMENTS

| | | |
|---|---|---|
| JP | 8-201634 | 8/1996 |
| JP | 2000-232710 | 8/2000 |
| JP | 2002-95121 | 3/2002 |
| WO | WO 2004/079423 A1 | 9/2004 |

OTHER PUBLICATIONS

Cable-lashing machine from http:///www.cablinginstall.com/articles/print/volume-5/issue-9/products-services/new-pro . . . , 1 page (Sep. 1, 1997).

GMP Model G Cable Lasher Operation and Maintenance Manual, 16 pages (Copyright 2005).

International Search Report and Written Opinion for PCT/US2011/023479 mailed Oct. 27, 2011.

Communication and extended European search report dated Nov. 6, 2013; Application No. EP 11740299.

* cited by examiner

LASHING TOGETHER MULTIPLE FIBER OPTIC TELECOMMUNICATIONS CABLES

CROSS-REFERENCE TO RELATED APPLICATION

The present application claims the benefit of U.S. Provisional Patent Application Ser. No. 61/346,290, filed May 19, 2010, which application is hereby incorporated by reference in its entirety.

BACKGROUND

Fiber optic telecommunications technology is becoming more prevalent as service providers strive to deliver higher bandwidth communication capabilities to customers/subscribers. The phrase "fiber to the x" (FTTX) generically refers to any network architecture that uses optical fiber in place of copper within a local distribution area. Example FTTX networks include fiber-to-the-node (FTTN) networks, fiber-to-the-curb (FTTC) networks and fiber-to-the-premises (FTTP) networks.

FTTN and FTTC networks use fiber optic cables that are run from a service provider's central office to a cabinet serving a neighborhood. Subscribers connect to the cabinet using traditional copper cable technology such as coaxial cable or twisted pair wiring. The difference between an FTTN network and an FTTC network relates to the area served by the cabinet. Typically, FTTC networks typically have cabinets closer to the subscribers that serve a smaller subscriber area than the cabinets of FTTN networks.

In an FTTP network, fiber optic cables are run from a service provider's central office all the way to the subscriber's premises. Example FTTP networks include fiber-to-the-home (FTTH) networks and fiber-to-the-building (FTTB) networks. In an FTTB network, optical fiber is routed from the central office over an optical distribution network to an optical network terminal (ONT) located in a building. The ONT typically includes active components that convert the optical signals into electrical signals. The electrical signals are typically routed from the ONT to the subscriber's residence or office space using traditional copper cable technology. In an FTTH network, fiber optic cable is run from the service provider's central office to an ONT located at the subscriber's residence or office space. Once again, at the ONT, optical signals are typically converted into an electrical signal for use with the subscriber's devices. However, to the extent that an end user may have devices that are compatible with optical signals, conversion of the optical signal to an electrical signal may not be necessary.

FTTP networks include active optical networks and passive optical networks. Active optical networks use electrically powered equipment (e.g., a switch, router, multiplexer or other equipment) to distribute signals and to provide signal buffering. Passive optical networks use passive beam splitters instead of electrically powered equipment to split optical signals. In a passive optical network, ONT's are typically equipped with equipment (e.g., wave-division multiplexing and time-division multiplexing equipment) that prevents incoming and outgoing signals from colliding and that filters out signals intended for other subscribers.

A typical passive FTTP network includes fiber optic cables routed from a central location (e.g., a service provider's central office) to a fiber distribution hub (FDH) located in a local area such as a neighborhood. The fiber distribution hub typically includes a cabinet in which one or more passive optical splitters are mounted. The splitters each are capable of splitting a signal carried by a single fiber to a plurality of fibers. The fibers split out at the splitter are routed from the fiber distribution hub into the local area using a fiber optic distribution cable. Fibers are routed from the fiber distribution cable to subscriber locations (e.g., homes, businesses or buildings) using various techniques. For example, fiber optic drop cables can be routed directly from a breakout location on the distribution cable to an ONT at a subscriber location. Alternatively, a stub cable can be routed from a breakout location of the distribution cable to a drop terminal. Drop cables can be run from the drop terminal to ONT's located at a plurality of premises located near the drop terminal.

SUMMARY

Features of the present disclosure relate to methods and systems for efficiently and cost effectively lashing together multiple fiber optic telecommunications cables in a fiber optic network.

An aspect of the present disclosure relates to a lashing assembly for lashing together fiber optic telecommunications cables. The lashing assembly comprises a first spool assembly. The first spool assembly comprises a first bobbin and a first twine. The first twine is wrapped around the first bobbin such that as a first cable and a second cable are passed through a passage through the first bobbin, the first twine pays off from the first bobbin and wraps around the first and second cables in a clockwise helix around lengthwise axes of the first and second cables. The first and second cables are fiber optic telecommunications cables. The lashing assembly also comprises a second spool assembly. The second spool assembly comprises a second bobbin and a second twine. The second twine is wrapped around the second bobbin such that as the first and second cables are passed through the passage through the second bobbin, the second twine pays off from the second bobbin and wraps around the first and second cables in a counterclockwise helix around the lengthwise axes of the first and second cables.

Another aspect of the present disclosure relates to a method that comprises passing a first cable and a second cable through a first bobbin. The first and second cables are fiber optic telecommunications cables. As the first and second cables are passed through the first bobbin, a first twine pays off from the first bobbin and wraps around both the first and second cables in a clockwise helix around lengthwise axes of the first and second cables. The method also comprises passing the first and second cables through a second bobbin. As the first and second cables are passed through the second bobbin, a second twine pays off from the second bobbin and wraps around both the first and second cables in a counterclockwise helix around the lengthwise axes of the first and second cables, thereby lashing together the first and second cables.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
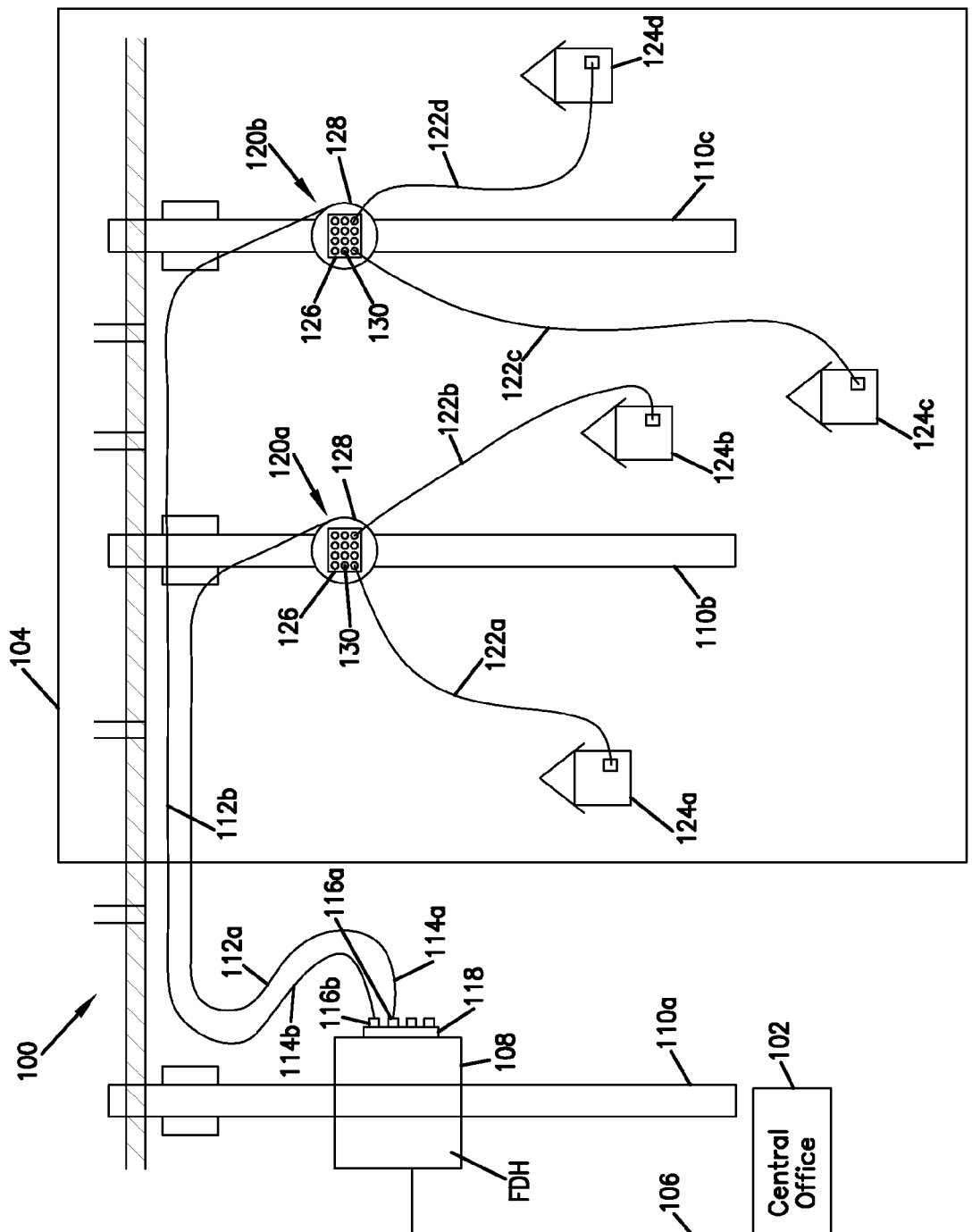
FIG. 1 shows an example fiber optic network in accordance with the principles of the present disclosure.

FIG. 1 shows an example fiber optic network 100 having features that are examples of inventive aspects in accordance with the principles of the present disclosure. The fiber optic network 100 is adapted for transmitting fiber optic telecommunication services between a central office 102 and a local area 104 (e.g., a local loop).

The fiber optic network 100 includes an F1 distribution cable 106 that preferably includes a plurality of optical fibers. For example, in one embodiment, the F1 distribution cable 106 may have on the order of 12 to 48 fibers. However, alternative numbers of fibers may also be used. One or more of the optical fibers of the F1 distribution cable 106 are routed to a fiber distribution hub 108. In the example of FIG. 1, the fiber distribution hub 108 is mounted on a utility pole 110a. It should be appreciated that in other embodiments, the fiber distribution hub 108 can be mounted in other places, such as on a pedestal or in an underground vault.

The fiber distribution hub 108 can include one or more passive optical splitters adapted to split signals carried by the fibers of the F1 distribution cable 106 into a plurality of fibers that are optically coupled to one or more F2 distribution cables 112a, 112b routed from the fiber distribution hub 108 into the local area 104.

Figure 2:
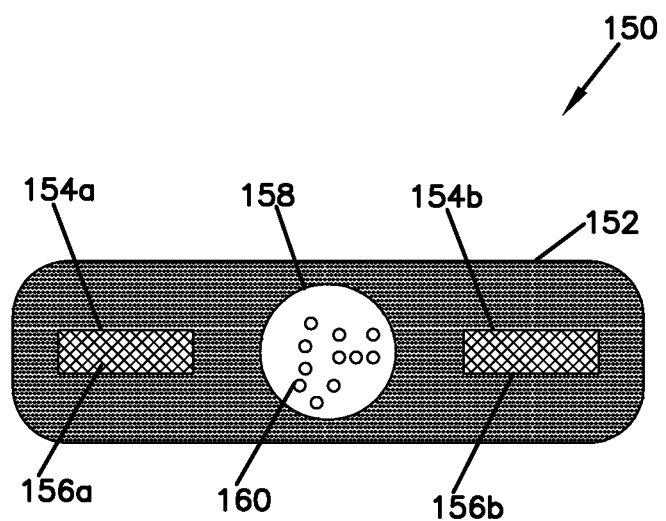
FIG. 2 illustrates an example F2 distribution cable suitable for use in the fiber optic network.

Reference is now made to the example of FIG. 2. FIG. 2 illustrates a cross-section of a F2 distribution cable 150 suitable for use as a F2 distribution cable in the fiber optic network 100. The F2 distribution cables 112a, 112b can have the same or similar cross-sections as the F2 distribution cable 150. As illustrated in the example of FIG. 2, the F2 distribution cable 150 comprises a jacket 152. The jacket 152 defines two strength member passages 154a and 154b that extend along a lengthwise axis of the F2 distribution cable 150. Strength members 156a and 156b as disposed within the strength member passages 154a and 154b. The strength members 156a and 156b can help to provide structural strength to the F2 distribution cable 150. Furthermore, the jacket 152 defines a fiber passage 158 that extends along the lengthwise axis of the F2 distribution cable 150. A set of optical fibers 160 extend along the lengthwise axis of the F2 distribution cable 150 through the fiber passage 158. In various embodiments, the set of optical fibers 160 includes various numbers of optical fibers. For example, in one embodiment, the set of optical fibers 160 can each include 12 optical fibers. Although the F2 distribution cable 150 has a generally rectangular cross-section, it should be appreciated that in other embodiments, F2 distribution cables having differently shaped cross-sections can be used in the fiber optic network 100. For example, in some embodiments, F2 distribution cables having round cross-sections are used in the fiber optic network 100.

Reference is now made again to FIG. 1. As shown in FIG. 1, the F2 distribution cables 112a, 112b include first ends 114a, 114b terminated by ruggedized multi-fiber connectors 116a, 116b. The multi-fiber connectors 116a, 116b interface with an adapter bank 118 provided at an exterior of the fiber distribution hub 108. The adapter bank 118 comprises a plurality of fiber optic adapters. The adapter bank 118 facilitates quickly providing an optical connection between the optical fibers within the fiber distribution hub 108 and the optical fibers of the F2 distribution cables 112a, 112b.

Drop terminals 120a, 120b are respectively located at opposite ends of the F2 distribution cables 112a, 112b. Drop terminals 120a, 120b are mounted on utility poles 110b, 110c. The F2 distribution cables 112a, 112b are routed from the drop terminals 120a, 120b to the fiber distribution hub 108 along the utility poles 110a, 110b, and 110c. Fiber optic drop cables 122a, 122b, 122c, 122d are routed from the drop terminals 120a, 120b to optical network terminals (ONT's) located at subscriber locations 124a, 124b, 124c, and 124d. The drop terminals 120a, 120b can be of the type described in U.S. patent application Ser. No. 12/487,318, filed Nov. 3, 2009, entitled "Methods and Systems for Distributing Fiber Optic Telecommunications Services to Local Area," the entire content of which is hereby incorporated by reference.

The drop terminals 120 include housings 126 and spools 128 connected to the housings 126. A plurality of ruggedized fiber optic adapters 130 are mounted to each of the housings 126. It will be understood that the term "ruggedized" refers to a component or system that is capable of withstanding the elements of an outdoor environment and that reduces the risk of or prevents the ingress of dirt, dust, water, etc. from entering the drop terminals 120. The ruggedized fiber optic adapters 130 include first ports that are accessible from outside the housings 126 and second ports that are accessible from inside the housings 126. The fibers of the F2 distribution cables 112 are terminated by optical connectors that are inserted into the second ports of the ruggedized fiber optic adapters 130. In certain embodiments, the optical connectors can be terminated directly on the ends of the fibers of the F2 distribution cables 112. In alternative embodiments, the optical connectors can be terminated indirectly to the ends of the optical fibers of the F2 distribution cables 112 through the use of connectorized pigtails that are spliced to the ends of the fibers of the F2 distribution cables 112.

The fiber optic drop cables 122 can be terminated at each end by a ruggedized optical connector. An example ruggedized optical connector is disclosed at U.S. Pat. No. 7,090,406 that is hereby incorporated by reference. The ruggedized optical connector terminated at one end of a given drop cable can be inserted into the first port of one of the drop terminals 120, while the ruggedized optical connector located at the opposite end of the drop cable can be inserted into a corresponding ruggedized adapter provided at the ONT located at one of the subscriber locations 124. In the subject embodiment, the ruggedized optical connectors includes a sealing member that engage sealing surfaces of the ruggedized fiber optic adapters 130 to provide environmental seals or weatherproof seals between the ruggedized optical connectors and the ruggedized fiber optic adapters 130.

Portions of the F2 distribution cables 112 can be wrapped around the spools 128 of the drop terminals 120. For example, the F2 distribution cables 112 may include first lengths that extend from the drop terminals 120 to the fiber distribution hub 108, and second lengths that are wrapped around the spools 128 of the given drop terminals 120. Thus, the total lengths of the F2 distribution cables 112 include lengths of cable extending from the drop terminals 120 to the fiber distribution hub 108 plus excess lengths that remain wrapped around the spools 128 after installation of the drop terminals 120. From the spools 128, the fibers of the F2 distribution cables 112 are routed into the interior of the housings 126 through access openings. Environmental seals can be provided at the access openings. In certain embodiments, the access openings are provided at backsides of the housings 126 while the ruggedized fiber optic adapters 130 are provided at front sides of the housings 126.

Prior to installation of the fiber optic network 100, an installer can identify the locations where it is desired to mount the drop terminals 120. The installer can then roughly estimate the distances from the drop terminal mounting locations to the fiber distribution hub 108. The installer can preferably select drop terminals from a supply of drop terminals having different lengths of F2 distribution cable pre-wrapped around the spools of the drop terminals. For example, drop terminals can be provided with F2 distribution cable lengths of 100 feet, 250 feet, 500 feet, 1,000 feet, 1,500 feet, 2,000 feet, 2,500 feet, 3,000 feet, etc. Thus, when a drop terminal mounting location is determined, the distance from the drop terminal mounting location to the fiber distribution hub 108 is estimated and a drop terminal having a pre-spooled length of F2 distribution cable sufficient to reach from the drop terminal mounting location to the fiber distribution hub 108 is selected. Typically, because the pre-spooled lengths of F2 distribution cable are not specifically customized for each drop terminal mounting location, the spools 128 will have certain amounts of excess cable that remains on the spools 128 after the F2 distribution cables 112 have been routed from the drop terminal mounting location to the fiber distribution hub 108.

To install the network 100, the drop terminal mounting locations are identified and the operator selects drop terminals that are pre-spooled with a sufficient length of F2 distribution cable to reach from the fiber distribution hub 102 to the identified drop terminal mounting location. The installer can then mount the drop terminal 120a to the utility pole 110b as shown in the example of FIG. 1. The installer can then mount the drop terminal 120b to the utility pole 110c as shown in the example of FIG. 1. After mounting the drop terminals 120a, 120b to the utility poles 110b, 110c, the installer pulls the first ends 114a, 114b of the F2 distribution cables 112 from the spools 128 and routes the F2 distribution cables 112 along the utility poles 110 to the fiber distribution hub 108. As the installer pulls the F2 distribution cables 112 from the spools, lashing assemblies lash together the F2 distribution cables 112.

Figure 3:
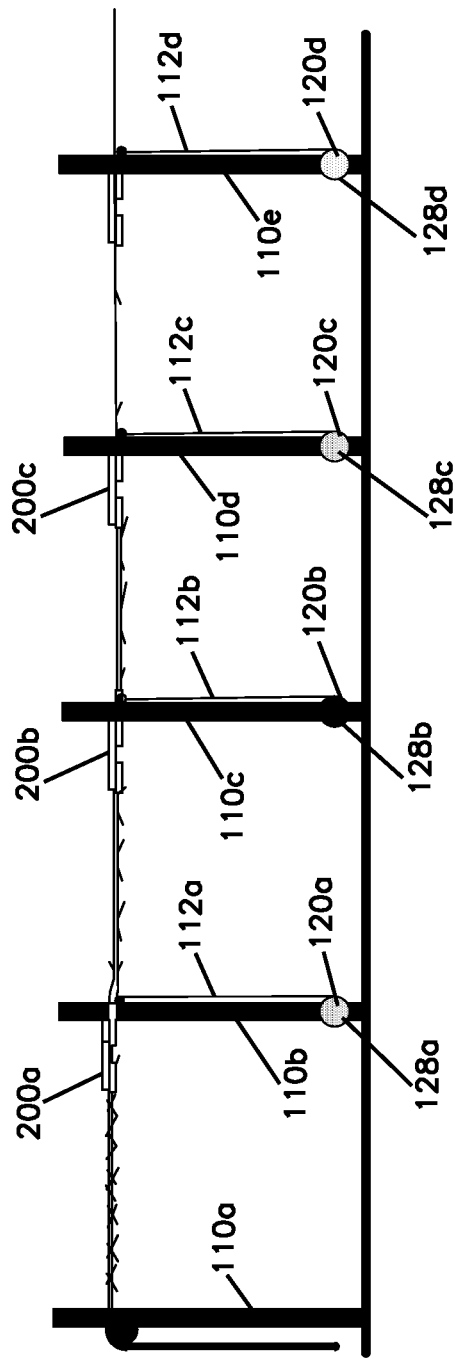
FIG. 3 shows an example deployment of lashing assemblies in a fiber optic network.

FIG. 3 shows an example deployment of lashing assemblies in the fiber optic network 100. As illustrated in the example of FIG. 3, the spools 128a, 128b, 128c, and 128d are mounted on the utility poles 110b, 110c, 110d, and 110e. The spools 128a, 128b, 128c, and 128d are collectively referred to herein as the "spools 128." The utility poles 110a, 110b, 110c, and 110d are collectively referred to herein as the "utility poles 110." Although not illustrated in the example of FIG. 3, multiple spools can be mounted to a single one of the utility poles 110. The spools 128 can be included in drop terminals.

F2 distribution cables 112a, 112b, 112c, and 112d are wound around respective ones of the spools 128. The F2 distribution cables 112a, 112b, 112c, 112d and 112e are collectively referred to herein as the "cables 112." Each of the cables 112 is to be routed to the fiber distribution hub 108 along a single path along the utility poles 110. As the number of mechanically-separate cables attached to the utility poles 110 increases, the likelihood of the cables becoming entangled increases. Moreover, as the number of mechanically-separate cables attached to the utility poles 110 increases, it can become progressively more difficult to perform maintenance work on the utility poles 110 and the cables 112.

Lashing assemblies 200a, 200b, and 200c are mounted to the utility poles 110. The lashing assemblies 200a, 200b and 200c are collectively referred to herein as the "lashing assemblies 200." The lashing assemblies 200 serve to lash together multiple ones of the cables 112. Hence, by lashing together multiple ones of the cables 112, the number of mechanically-separate cables attached to the utility poles 110 is reduced. In this way, lashing together multiple ones of the cables 112 can reduce the likelihood of the cables 112 becoming entangled and can make it easier to perform maintenance work on the cables 112. Moreover, lashing together multiple ones of the cables 112 can make the cables 112 effectively stronger.

Figure 4:
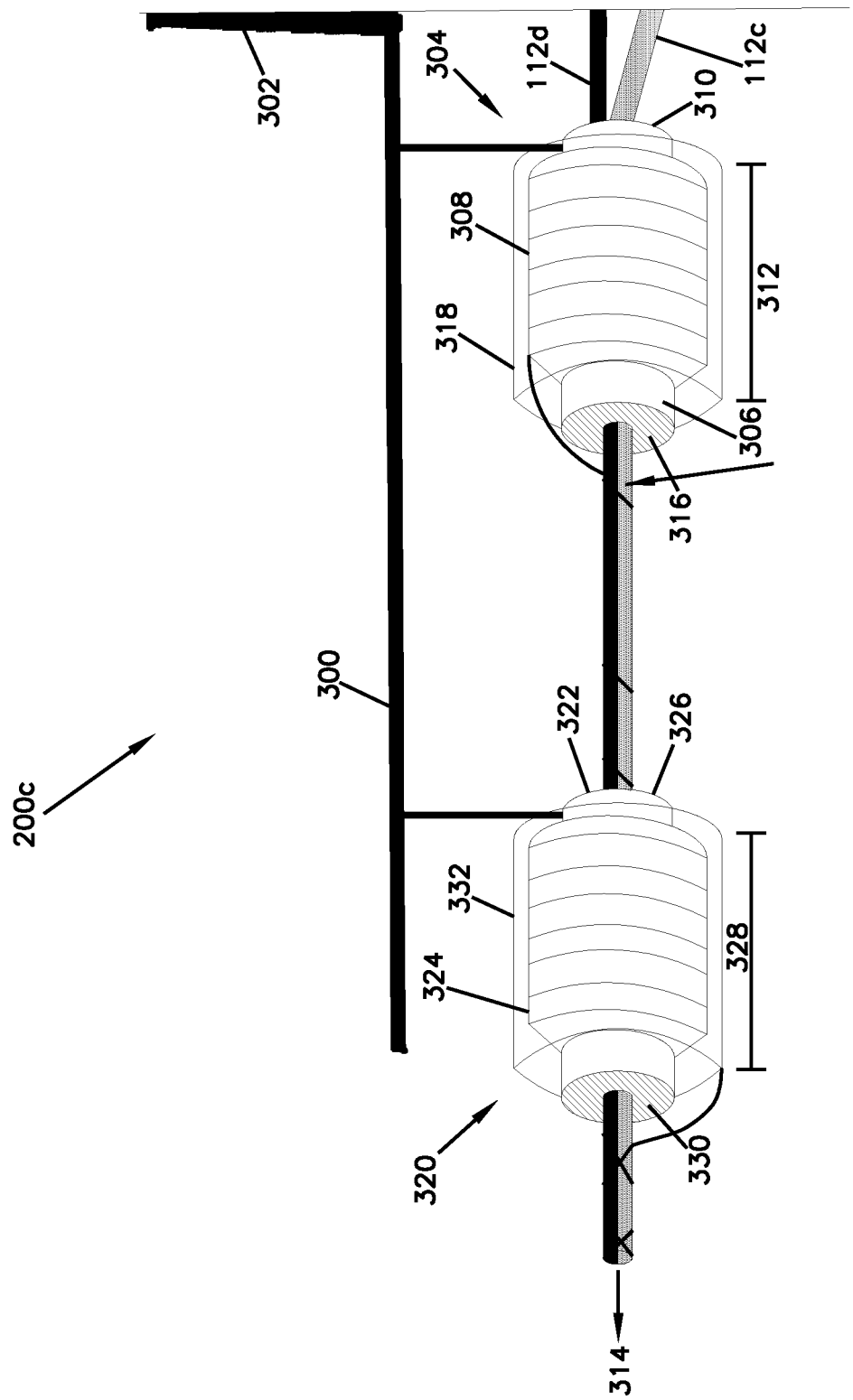
FIG. 4 illustrates example details of a lashing assembly.

FIG. 4 illustrates example details of the lashing assembly 200c. Although the lashing assembly 200c is illustrated in the example of FIG. 4, it should be appreciated that other ones of the lashing assemblies 200 can have similar details.

As illustrated in the example of FIG. 4, the lashing assembly 200c comprises a bracket 300. The bracket 300 is suitable for mounting to the utility pole 110d. In various embodiments, the bracket 300 can have various features that make the bracket 300 suitable for mounting to a utility pole. For instance, in the example of FIG. 4, the bracket 300 has a flange 302. Screws, bolts, rivets, staples, nails, or other fastening devices can be inserted through holes in the flange 302 in order to mount the bracket 300 to the utility pole 110d. In another example, the bracket 300 can be strapped or tied to the utility pole 110d.

A spool assembly 304 is attached to the bracket 300. The spool assembly 304 comprises a bobbin 306. The bobbin 306 is attached to the bracket 300 in a stationary way. In other words, the bobbin 306 does not move or rotate relative to the bracket 300. In various embodiments, the bobbin 306 is made of various materials. For example, the bobbin 306 can be made of cardboard, plastic, metal, or another material.

Twine 308 is wrapped around an outer surface of the bobbin 306. In various embodiments, the twine 308 can be made of various materials that are resistant to stretching. For example, the twine 308 can be an aramid fiber, such as Kevlar®. In other examples, the twine 308 can be oriented polyester, oriented polypropylene, or another type of material that is resistant to stretching. In some embodiments, the twine 308 is wrapped around the outer surface of the bobbin 306 in two or more layers. For example, a first layer of the twine 308 can be wrapped directly over the outer surface of the bobbin 306, a second layer of the twine 308 can be wrapped over the first layer of the twine 308, a third layer of the twine 308 can be wrapped over the second layer of the twine 308, and so on.

Figure 5:
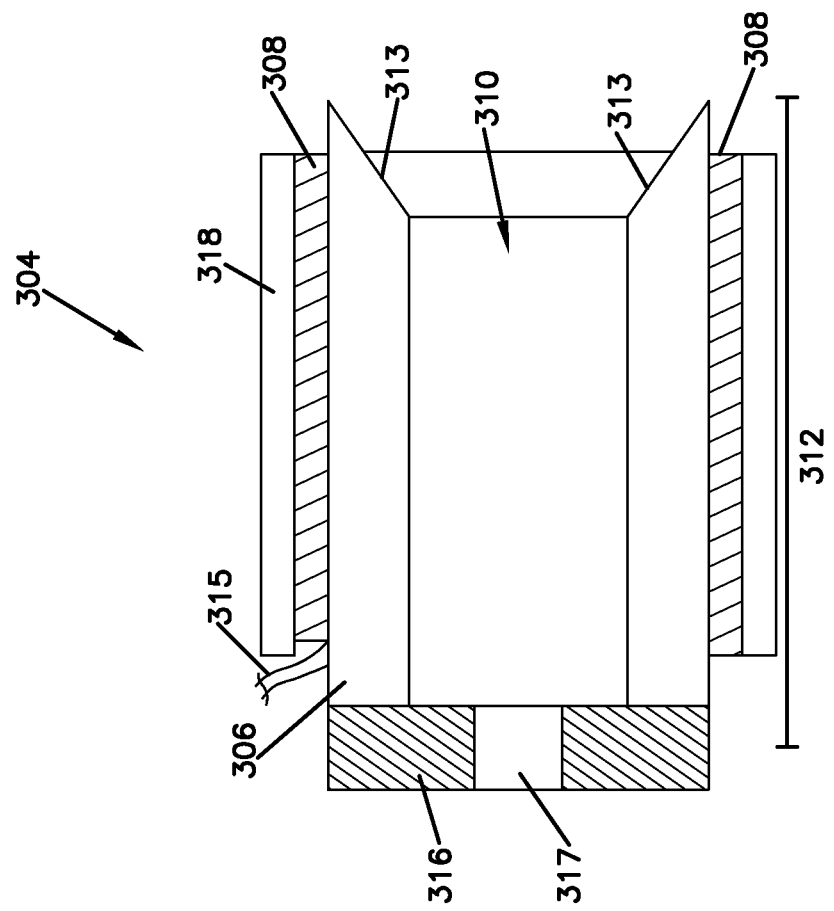
FIG. 5 illustrates example details of a spool assembly.

Reference is now made to the example of FIG. 5. FIG. 5 illustrates example details of the spool assembly 304. As illustrated in the example of FIG. 5, the bobbin 306 is shaped such that the bobbin 306 defines a passage 310 along a lengthwise axis 312 of the bobbin 306. The cables 112c and 112d are passed through the passage 310 of the bobbin 306. In some embodiments, the passage 310 has a consistent diameter through the bobbin 306. In other embodiments, the bobbin 306 is shaped such that the passage 310 widens at a cable entry end of the bobbin 306, forming a bell-shaped mouth 313. The cable entry end of the bobbin 306 is the end of the bobbin 306 into which the cables 112c and 112d are inserted (i.e., the end of the bobbin 306 closest to the drop terminal 120c). Having the bell-shaped mouth 313 on the cable entry end of the bobbin 306 may make it easier to guide the cables 112c and 112d into the passage 310. Furthermore, in some embodiments, a lip of the bell-shaped mouth 313 flares out, helping to prevent the twine 308 from paying off from the cable entry end of the bobbin 306.

When the ends of the cables 112*c* and 112*d* are passed through the passage 310 of the bobbin 306, an installer attaches an outer end 315 of the twine 308 to the cables 112*c* and 112*d*. The outer end 315 of the twine 308 is the end of the twine 308 at the outermost layer of the twine 308 and available to be attached to the cables 112*c* and 112*d*. In various embodiments, the installer attaches the outer end 315 of the twine 308 to the cables 112*c* and 112*d* in various ways. For example, the installer ties or tapes the outer end 315 of the twine 308 to either the cable 112*c* or the cable 112*d*. In another example, a multi-fiber connector is attached to the ends of the cables 112*c* and 112*d* that are to be attached to the fiber distribution hub 108. In this example, the installer attaches the outer end 315 of the twine 308 to the cables 112*c* and 112*d* by tying, taping, or otherwise connecting the outer end 315 of the twine 308 to the multi-fiber connector.

As the cables 112*c* and 112*d* continue to pass through the passage 310 in the bobbin 306, the twine 308 pays off from the bobbin 306 and wraps around the cables 112*c* and 112*d* in a counterclockwise direction around the lengthwise axes 314 of the cables 112*c* and 112*d*. The twine 308 wraps around the cables 112*c* and 112*d* in a counterclockwise direction because of the direction in which the twine 308 is wrapped around the bobbin 306. Because the twine 308 wraps around the cables 112*c* and 112*d* in a counterclockwise direction as the cables 112*c* and 112*d* pass through the bobbin 306, the twine 308 forms a counterclockwise helix around both of the cables 112*c* and 112*d*. The bobbin 306 does not rotate as the cables 112*c* and 112*d* pass through the bobbin 306.

Furthermore, the spool assembly 304 comprises a tensioning cover 318. In various embodiments, the tensioning cover 318 is made of various elastic materials. For example, the tensioning cover 318 can be made of a latex rubber or another type of elastic material. The tensioning cover 318 covers the twine 308. The tensioning cover 318 radially compresses the twine 308 onto the bobbin 306. As the twine 308 pays off from the bobbin 306, the tensioning cover 318 radially shrinks In this way, the tensioning cover 318 helps to prevent the twine 308 from accidentally paying off from the bobbin 306. Furthermore, because the tensioning cover 318 radially compresses the twine 308, the tensioning cover 318 provides tension on the twine 308 such that the twine 308 is appropriately tightened around the cables 112*c* and 112*d* as the cables 112*c* and 112*d* pass through the passage 310 through the bobbin 306. The twine 308 is appropriately tightened around the cables 112*c* and 112*d* when the twine 308 makes the cables 112*c* and 112*d* act mechanically like a single cable.

The spool assembly 304 also comprises a faceplate 316. The faceplate 316 is disposed at the cable exit end of the bobbin 306. The cable exit end of the bobbin 306 is the end of the bobbin 306 from which the cables 112*c* and 112*d* exit the bobbin 306. The faceplate 316 has one or more holes 317 through which the cables 112*c* and 112*d* pass. The holes 317 in the faceplate 316 serve to align the cables 112*c* and 112*d* into a compact geometric configuration. For example, in some embodiments, the cables 112*c* and 112*d* have generally rectangular profiles. In this example, the holes in the faceplate 316 serve to align the cables 112*c* and 112*d* such that when the cables 112*c* and 112*d* exit the passage 310 through the bobbin 306, the top surface of the cable 112*c* is flush with the bottom surface of the cable 112*d* and the side surfaces of the cables 112*c* and 112*d* are aligned.

In some embodiments, the installer attaches the faceplate 316 to the cable exit end of the bobbin 306 after the installer initially passes the cables 112*c* and 112*d* through the bobbin 306. In other embodiments, the faceplate 316 is fixed to the cable exit end of the bobbin 306 and the installer passes the cables 112*c* and 112*d* through the faceplate 316 when the installer passes the cables 112*c* and 112*d* through the bobbin 306.

When the installer has pulled a sufficient amount of the cables 112*c* and 112*d* through the bobbin 306, the installer can sever the part of the twine 308 wrapped around the cables 112*c* and 112*d* from any remaining part of the twine 308 still wrapped around the bobbin 306. After severing the twine 308, the installer can unspool and discard the remaining part of the twine 308. The installer can then remove the bobbin 306 from the cables 112*c* and 112*d*. In various embodiments, the installer can perform various actions to remove the bobbin 306 from the cables 112*c* and 112*d*. For example, the installer can cut a lengthwise split into the bobbin 306 and then pass the cables 112*c* and 112*d* through the lengthwise split. In other examples, the bobbin 306 is manufactured with the lengthwise split. After removing the bobbin 306 from the cables 112*c* and 112*d*, the installer can discard or recycle the bobbin 306.

In some embodiments, the bracket 300, the bobbin 306, the twine 308, and the tensioning cover 318 are weather-resistant. Consequently, the bracket 300, the bobbin 306, the twine 308, and the tensioning cover 318 can be used outdoors for lengthy periods of time.

Reference is now made again to FIG. 4. As illustrated in the example of FIG. 4, the lashing assembly 200*c* comprises a spool assembly 320 in addition to the spool assembly 304. The spool assembly 320 is attached to the bracket 300 in a stationary way. The spool assembly 320 comprises a bobbin 322. The bobbin 322 can have a have a similar size and shape as the bobbin 306 of the spool assembly 304 and be made of similar materials. Twine 324 is wrapped around the outer surface of the bobbin 322. The twine 324 wrapped around the bobbin 322 can be made of the same material as the twine 308 wrapped around the bobbin 306.

Like the bobbin 306, the bobbin 322 is shaped such that the bobbin 322 defines a passage 326 through a lengthwise axis 328 of the bobbin 322. In addition to passing the cables 112*c* and 112*d* through the passage 310 of the bobbin 306, the cables 112*c* and 112*d* are passed through the passage 326 of the bobbin 322. When the cables 112*c* and 112*d* are passed through the passage 326 of the bobbin 322, the installer attaches the outer end of the twine 324 to the cables 112*c* and 112*d*.

As the cables 112*c* and 112*d* continue to pass through the passage 326 in the bobbin 322, the twine 324 pays off from the bobbin 322 and wraps around the cables 112*c* and 112*d* in a clockwise direction around the lengthwise axes 314 of the cables 112*c* and 112*d*. Because the twine 324 wraps around the cables 112*c* and 112*d* in a clockwise direction as the cables 112*c* and 112*d* pass through the bobbin 322, the twine 324 forms a clockwise helix around both of the cables 112*c* and 112*d*. In this way, the twine 308 and the twine 324 form a double helix around the cables 112*c* and 112*d*, thereby lashing together the cables 112*c* and 112*d*. The bobbin 322 remains stationary as the cables 112*c* and 112*d* are passed through the bobbin 322.

The spool assembly 320 also comprises a faceplate 330 disposed at the cable exit end of the bobbin 322. The faceplate 330 plays a role in the spool assembly 320 similar to the role played by the faceplate 316 in the spool assembly 304. That is, the faceplate 330 aligns the cables 112*c* and 112*d* into a compact geometric configuration as the cables 112*c* and 112*d* pass through the bobbin 322. The faceplate 330 can be of the same or similar size and shape as the faceplate 316 and be made of the same or similar materials.

In addition, the spool assembly 320 comprises a tensioning cover 332. The tensioning cover 332 plays a role in the spool assembly 320 similar to the role played by the tensioning cover 318 in the spool assembly 304. That is, the tensioning cover 332 helps to prevent the twine 324 from accidentally paying off from the bobbin 322. In addition, the tensioning cover 332 provides tension on the twine 324 such that the twine 324 is appropriately tightened around the cables 112c and 112d as the cables 112c and 112d pass through the passage 326 of the bobbin 322. The tensioning cover 332 can be of the same or similar size and shape as the tensioning cover 318 and be made of the same or similar materials.

Reference is now made again to FIG. 3. In some embodiments, the bobbins in different ones of the lashing assemblies 200 can have different interior diameters. In other words, the diameters of the passages through the bobbins in different ones of the lashing assemblies 200 can be different. The different interior diameters allow for different numbers of cables to be passed through the bobbins. In the example of FIG. 2, the interior diameters of the bobbins in the lashing assembly 200b are larger than the interior diameters of the bobbins in the lashing assembly 200c. In this is because only the cables 112c and 112d pass through the bobbins of the lashing assembly 200c, whereas the cables 112b, 112c, and 112d pass through the bobbins of the lashing assembly 200b. Similarly, the interior diameters of the bobbins in the lashing assembly 200a are larger still than the interior diameters of the bobbins in the lashing assembly 200b because an additional cable passes through the bobbins in the lashing assembly 200a.

The outer diameters of the bobbins of the lashing assemblies 200 controls the lay length of the twine paid off from the bobbins. The lay length of the twine paid off from a bobbin is a measure of the length of twine required to wrap a given length of the cables 112. For example, bobbins having larger outer diameters can have longer lay lengths than bobbins having smaller outer diameters.

Figure 6:
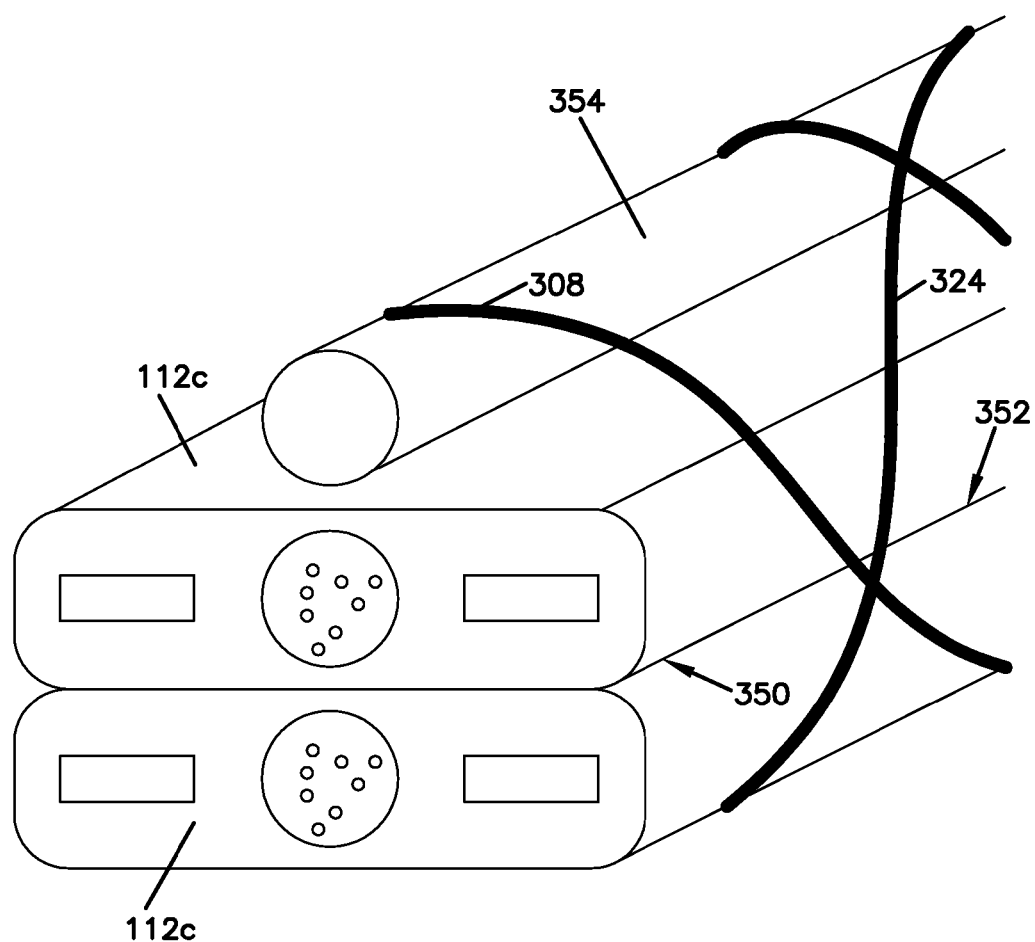
FIG. 6 illustrates how the cables can be aligned in a compact geometric configuration.

Reference is now made to the example of FIG. 6. FIG. 6 illustrates how the cables 112c and 112d can be aligned in a compact geometric configuration. In the example of FIG. 6, the cables 112c and 112d have generally rectangular profiles. In this example, the holes in the faceplate 316 serve to align the cables 112c and 112d such that when the cables 112c and 112d exit the passage 310 through the bobbin 306, a top surface 350 of the cable 112c is flush with a bottom surface 352 of the cable 112d and the side surfaces of the cables 112c and 112d are aligned.

In some embodiments, a messenger wire is passed through the lashing assemblies 200 along with the cables 112. The messenger wire provides structural reinforcement to the cables 112. For instance, the messenger wire can reduce strain on the cables 112c and 112d caused by wind, ice accumulation, movements of the utility poles 110, or other factors. The messenger wire can be made of various materials. For example, the messenger wire can be made of steel, a dielectrical wire, or another material. As illustrated in the example of FIG. 6, the faceplates 316 and 330 of the lashing assembly 200c serve to hold the cables 112c and 112d along with a messenger wire 354 in a compact geometric configuration.

Furthermore, FIG. 6 illustrates how the twine 308 wraps around the messenger cable 354 and the cables 112c, 112d in a counterclockwise helix when the messenger cable 354 and the cables 112c, 112 are passed through the bobbins 306 and 322 of the lashing assembly 200c. FIG. 6 also illustrates how the twine 324 wraps around the messenger cable 354 and the cables 112c, 112d in a clockwise helix when the messenger cable 354 and the cables 112c, 112 are passed through the bobbins 306 and 322 of the lashing assembly 200c.

Although not illustrated in the example of FIG. 6, the faceplates of different ones of the lashing assemblies 200 can align the cables passing through the bobbins in the lashing assemblies 200 into different geometric configurations. For example, in some embodiments, the cables 112 have circular profiles. In this example, the faceplates of the lashing assembly 200c align the cables 112c and 112d into a line. Furthermore, in this example, the faceplates of the lashing assembly 200b align the cables 112b, 112c, and 112d into a triangle. In this example, the faceplates of the lashing assembly 200a align the cables 112a, 112b, 112c, and 112d into a parallelogram.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A lashing assembly for lashing together fiber optic telecommunications cables, the lashing assembly comprising:
   a first spool assembly, the first spool assembly comprising:
      a first bobbin; and
      a first twine, the first twine wrapped around the first bobbin such that as a first cable and a second cable are passed through a passage through the first bobbin, the first twine pays off from the first bobbin and wraps around the first and second cables in a clockwise helix around lengthwise axes of the first and second cables, the first and second cables being fiber optic telecommunications cables; and
   a second spool assembly, the second spool assembly comprising:
      a second bobbin; and
      a second twine, the second twine wrapped around the second bobbin such that as the first and second cables are passed through the passage through the second bobbin, the second twine pays off from the second bobbin and wraps around the first and second cables in a counterclockwise helix around the lengthwise axes of the first and second cables.

2. The lashing assembly of claim 1,
   wherein the first spool assembly comprises a tensioning cover that provides tension on the first twine such that the first twine is appropriately tightened around the first and second cables as the first and second cables pass through the passage through the first bobbin; and
   wherein the second spool assembly comprises a tensioning cover that provides tension on the second twine such that the second twine is appropriately tightened around the first and second cables as the first and second cables pass through the passage through the second bobbin.

3. The lashing assembly of claim 2, wherein the tensioning covers of the first and second spool assemblies are made of an elastic material.

4. The lashing assembly of claim 2, wherein the first twine is wrapped in multiple layers around the first bobbin and the second twine is wrapped in multiple layers around the second bobbin.

5. The lashing assembly of claim 1,
   wherein the first spool assembly comprises a first faceplate, the first faceplate attached to a cable exit end of the first bobbin, the first faceplate aligning the first and second cables in a compact geometric configuration as the first and second cables pass through the first bobbin;

wherein the second spool assembly comprises a second faceplate, the second faceplate attached to a cable exit end of the second bobbin, the second faceplate aligning the first and second cables in the compact geometric configuration as the first and second cables pass through the second bobbin.

6. The lashing assembly of claim 5, wherein the first faceplate is removable from the first bobbin and the second faceplate is removable from the second bobbin.

7. The lashing assembly of claim 1, wherein the lashing assembly further comprises a bracket suitable for mounting to a utility pole, wherein the first and second spool assemblies are supported by the bracket when the bracket is mounted to the utility pole.

8. The lashing assembly of claim 1,
wherein the first bobbin is removable from the first and second cables; and
wherein the second bobbin is removable from the first and second cables.

9. The lashing assembly of claim 1, wherein the first and second bobbins remain stationary as the first and second cables are passed through the first and second bobbins.

10. The lashing assembly of claim 1,
wherein the first cable comprises multiple optical fibers surrounded by a jacket; and
wherein the second cable comprises multiple optical fibers surrounded by a jacket.

11. A method comprising:
passing a first cable and a second cable through a passage through a first bobbin of a first spool assembly, the first and second cables being fiber optic telecommunications cables, wherein as the first and second cables are passed through the first bobbin, a first twine pays off from the first bobbin and wraps around both the first and second cables in a clockwise helix around lengthwise axes of the first and second cables; and
passing the first and second cables through the passage through a second bobbin of a second spool assembly, wherein as the first and second cables are passed through the second bobbin, a second twine pays off from the second bobbin and wraps around both the first and second cables in a counterclockwise helix around the lengthwise axes of the first and second cables, thereby lashing together the first and second cables.

12. The method of claim 11,
wherein one end of the first cable is connected to a first drop terminal; and
wherein one end of the second cable is connected to a second drop terminal.

13. The method of claim 12, wherein the method further comprises attaching the first and second cables to a fiber distribution hub after pulling the first and second cables through the first and second bobbins.

14. The method of claim 12, prior to pulling the first and second cables through the first and second bobbins, installing the first drop terminal on a first utility pole and installing the second drop terminal on a second utility pole.

15. The method of claim 14, wherein the first and second bobbins are attached to a bracket that is attached to the second utility pole.

16. The method of claim 11,
wherein the first twine is wound around the first bobbin;
wherein a first tensioning cover covers the first twine while the first twine is on the first bobbin, the first tensioning cover providing tension on the first twine such that the first twine is appropriately tightened around the first and second cables as the first and second cables are passed through the first bobbin;
wherein the second twine is wound around the second bobbin; and
wherein a second tensioning cover covers the second twine while the second twine is on the second bobbin, the second tensioning cover providing tension on the second twine such that the second twine is appropriately tightened around the first and second cables as the first and second cables are passed through the second bobbin.

17. The method of claim 11,
wherein the first bobbin is removable from the first and second cables; and
wherein the second bobbin is removable from the first and second cables.

18. The method of claim 11, further comprising:
attaching a first faceplate to a cable exit end of the first bobbin, the first faceplate aligning the first and second cables in a compact geometric configuration as the first and second cables pass through the first bobbin;
attaching a second faceplate to a cable exit end of the second bobbin, the second faceplate aligning the first and second cables in the compact geometric configuration as the first and second cables pass through the second bobbin.

19. The method of claim 11,
wherein the first cable comprises multiple optical fibers surrounded by a jacket; and
wherein the second cable comprises multiple optical fibers surrounded by a jacket.

20. The method of claim 11,
wherein the method further comprises:
passing the first cable, the second cable, and a third cable through a third bobbin, wherein as the first, second, and third cables are passed through the third bobbin, a third twine pays off from the third bobbin in a clockwise direction, forming a clockwise helix around the first, second, and third cables; and
passing the first, second, and third cables through a fourth bobbin, wherein as the first, second, and third cables are passed through the fourth bobbin, a fourth twine pays off from the fourth bobbin in a counterclockwise direction, forming a counterclockwise helix around the first, second, and third cables, thereby lashing together the first, second, and third cables; and
wherein the first and second bobbins are part of a first lashing assembly attached to a utility pole and the third and fourth bobbins are part of a second lashing assembly attached to another utility pole;
wherein interior diameters of the third and fourth bobbins are greater than interior diameters of the first and second bobbins.

* * * * *